US006793349B2

(12) United States Patent  
Hooper (10) Patent No.: US 6,793,349 B2  
(45) Date of Patent: Sep. 21, 2004

(54) IMAGE PROJECTOR FOR USE WITH LUMINAIRES

(75) Inventor: Kevin C. Hooper, Beachwood, OH (US)

(73) Assignee: Rosco Laboratories, Inc., Hollywood, CA (US)

(*) Notice: Subject to any disclaimer, the term of this patent is extended or adjusted under 35 U.S.C. 154(b) by 0 days.

(21) Appl. No.: 10/281,859

(22) Filed: Oct. 28, 2002

(65) Prior Publication Data

US 2003/0081186 A1 May 1, 2003

Related U.S. Application Data

(60) Provisional application No. 60/334,717, filed on Oct. 31, 2001.

(51) Int. Cl.[7] .......................... G03B 21/00; G03B 1/48; G03B 21/14; G03B 21/18; G03B 23/00
(52) U.S. Cl. .......................... 353/120; 353/23; 353/55; 353/60; 353/95; 353/108; 353/119; 353/122; 40/564; 362/294
(58) Field of Search .............................. 353/120, 22–24, 353/60, 92, 95–96, 108, 114, 118, 119, 122, 52, 55, 57; 348/373; 40/564; 362/284, 297, 294, 264

(56) References Cited

U.S. PATENT DOCUMENTS

| 1,273,843 A | 7/1918 | Foley ........................... 362/297 |
| 1,598,444 A | 8/1926 | Howell ......................... 352/202 |
| 1,716,322 A | 6/1929 | Proctor ......................... 353/61 |
| 2,618,738 A | 11/1952 | Foulds ......................... 362/294 |
| 2,943,534 A | 7/1960 | Pierschel ...................... 352/146 |
| 3,542,464 A | 11/1970 | Dimitracopoulos .......... 353/57 |
| 3,632,198 A | 1/1972 | Puffer ........................... 353/60 |
| 4,453,810 A | 6/1984 | Curiel .......................... 353/55 |
| 4,701,833 A * | 10/1987 | Bornhorst .................... 362/294 |
| 4,843,528 A * | 6/1989 | Pearce-Harvey et al. ... 362/277 |
| 5,128,838 A * | 7/1992 | Brandess ...................... 362/18 |
| 5,170,196 A | 12/1992 | Itoh ............................. 353/122 |
| 5,442,415 A | 8/1995 | Chao ........................... 353/119 |
| 5,497,573 A | 3/1996 | Stadjuhar ...................... 40/564 |
| 5,521,662 A | 5/1996 | Suzuki ......................... 396/429 |
| 5,626,416 A | 5/1997 | Romano ...................... 362/264 |
| 5,663,762 A | 9/1997 | Nishiyama ................... 348/373 |
| 5,791,755 A * | 8/1998 | Henry et al. ................. 353/120 |
| 5,800,034 A | 9/1998 | Hoyt ........................... 353/109 |
| 5,951,137 A | 9/1999 | Bortz ........................... 353/96 |
| 6,227,672 B1 | 5/2001 | Bortz ........................... 353/96 |
| 6,601,973 B2 * | 8/2003 | Rasmussen et al. ......... 362/282 |
| 6,616,306 B1 * | 9/2003 | Tawil et al. .................. 362/320 |

OTHER PUBLICATIONS

Product description for Angstrom Stage Lighting. Inc.'s FINELITE "Scrolling Image Projector", printed on Sep. 26, 2001 from www.angstromlighting.com/linelite.html.

(List continued on next page.)

Primary Examiner—Russell Adams  
Assistant Examiner—Magda Cruz  
(74) Attorney, Agent, or Firm—Ostrager Chong Flaherty & Broitman P.C.

(57) ABSTRACT

An image projector that drops into the accessory slot of a luminaire and projects high quality images printed on plastic slides in full color and photographic detail for extended time periods without heat degradation. The projector comprises a cooling fan, infrared and ultraviolet light filter means, and an inexpensive and removable slide assembly comprising a plastic image slide, a protective film slide and at least one mounting plate. The cooling fan is combined with layered, reflective filters to create a protected environment for the plastic image slide to survive the extreme heat at the gate of today's efficient luminaires. The plastic image slide is created on a plastic sheet using conventional computer printing technologies.

21 Claims, 8 Drawing Sheets

OTHER PUBLICATIONS

Product description for Premier Lighting & Production Company's "TIPA: Transparent Image Protection Accessory", printed on Sep. 26, 2001 from www.premier.lighting.com/tipa/tipa.html.

Product description for Selecon's PACIFIC elipsoidal zoom-spot, printed on Sep. 26, 2001 from www.selecon.co.nz/english/support/gobos–desktop.html.

Product description for PIGI's Automated Rotating Double Scroller Projector, printed on Sep. 26, 2001 from www.etc–pigi.com/eng/ddra.html.

Product description for GAM Products, Inc.'s GAMFILM/FX, printed on Sep. 26, 2001 from www.gamonline.com/catalog/filmfx/index.shtml.

Product description for Whitelight Ltd.'s VSFX System printed on Sep. 26, 2001 from www.whilelight.ltd.uk/sfx/VSsyst.htm.

Product description for GAM Products. Inc.'s GAM Scene Machine, printed on Sep. 26, 2001 from www.gamonline.com/catalog/scenemachine/index.shtml.

European Search Report in corresponding EP Application No. EP 02 25 7578, dated Feb. 25, 2003.

* cited by examiner

IMAGE PROJECTOR FOR USE WITH LUMINAIRES

CROSS REFERENCE TO RELATED APPLICATIONS

This application claims the benefit of U.S. Provisional Patent Application No. 60/334,717 filed Oct. 31, 2001, which is incorporated herein by reference.

FIELD OF INVENTION

This invention generally relates to a device for projecting low cost, high-resolution images from existing lighting fixtures and, more particularly, to a combination image slide holder and cooling device for projecting images printed on plastic transparencies from commercially available theatrical and architectural luminaires for extended time periods.

BACKGROUND OF INVENTION

In typical theatrical and architectural applications, luminaires are used to direct bright or dimmed, sharp or soft-edged illumination toward a subject by focusing intense light from a high-energy lamp through its lenses. For example, luminaires may be used for spotlighting, projecting images such as logos or signs, or enhancing logos, signs, products or other goods. Four of the most common commercially available luminaires are the ETC Source Four, the Altman Shakespeare, Strand SL, and the Selecon Pacific Cool Light.

In addition to illuminating a subject, it is often desired in theatrical and architectural applications to provide a pattern or image in the light, or to change the light's color, brightness, beam diameter or focus. To achieve such effects, luminaires typically include an accessory slot in the body of the luminaire and/or an accessory holder on the front end of the luminaire. The accessory slot may be used as a holder of metal or glass patterns, a drop-in iris, a gobo rotator or a dual gobo rotator. The front accessory holder may be used for holding color frames, glass color frames, donuts, snoots or color changers and/or combinations of accessories as required. Although some of these devices may be used to project an image from a luminaire, many of the devices are expensive to fabricate because of the materials required to withstand the heat generated by the luminaire's lamp (for example, metal or glass), or they do not have a long use life, or they are time consuming to use. For example, many of the devices utilize metal or glass gobos etched with an image and inserted into the accessory slot. Such gobos are expensive and require specialized equipment and time to manufacture. On the other hand, when flexible film or plastic materials are used, they typically have a very short life span due to degradation from the heat of the lamp.

Some manufacturers have attempted to overcome the problems associated with projecting low-cost transparency images for extended periods of time by providing devices that utilize certain combinations of fans and filters to achieve the cooling required to prevent degradation of the image transparency. However, these devices are typically expensive stand-alone devices that were developed only for this one limited purpose and cannot be used with commercially available luminaires, for example, as a "drop-in" accessory.

It is therefore a broad object of this invention to overcome the above-mentioned shortcomings of known luminaire accessories and image projectors, and a more particular object of this invention to provide an improved image projector device that is easily used in combination with commercially available luminaires, and provides for easily fabricated, low cost, high-resolution images that can be used many times despite the heat generated in such luminaires that would otherwise prevent such use.

SUMMARY OF INVENTION

In the present invention, these objects, as well as others, are achieved by providing an image projector that drops into the accessory slot of a luminaire and comprises a cooling fan, infrared and ultraviolet light filter means, and an inexpensive and removable "slide assembly" comprising a plastic image slide, a protective film slide and at least one mounting plate. The cooling fan is combined with layered, reflective filters to create a protected environment for the plastic image slide to survive the extreme heat at the gate of today's efficient luminaires. The plastic image slide is created on a high temperature plastic base using conventional computer printing technologies, thereby allowing virtually any image to be printed on the slide. The image projector of this invention can thus project high quality images in full color and photographic detail previously available only through advanced projection systems or from expensive glass gobos.

Other objects, features and advantages of the present invention will be apparent when the detailed description of the preferred embodiments of the invention are considered in conjunction with the drawings which should be construed in an illustrative and not limiting sense as follows:

DETAILED DESCRIPTION OF PREFERRED EMBODIMENTS

Figure 11:
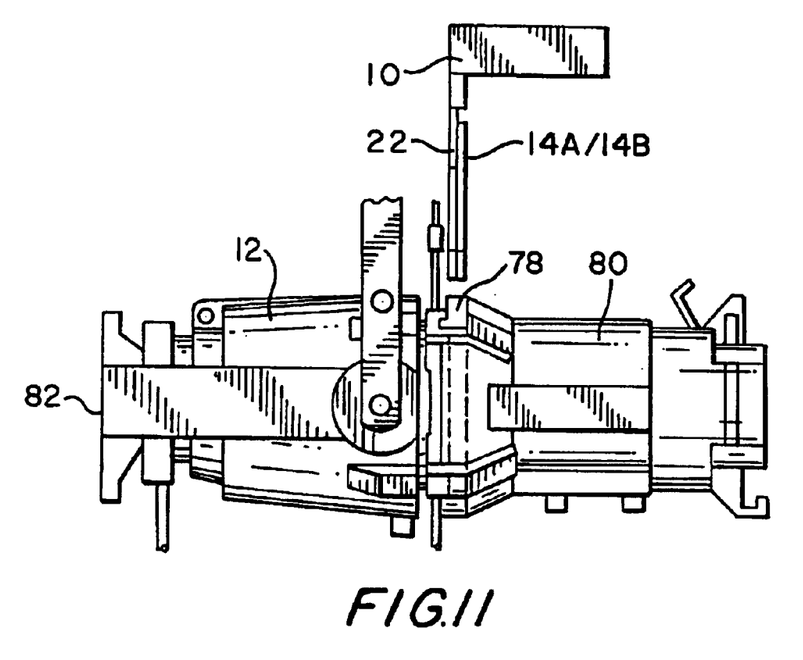
FIG. 11 is a side view of a representative luminaire and placement of an image projector in accordance with this invention prior to installation.
Figure 12:
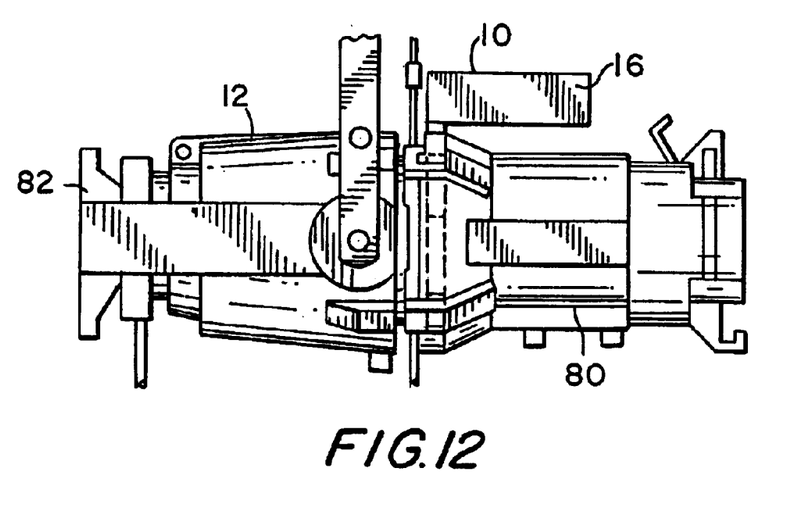
FIG. 12 is a side view of an image projection in accordance with this invention installed in a representative luminaire.

An image projector 10 for projecting low cost, high-resolution images from a luminaire while simultaneously protecting the images from the heat of the luminaire's lamp is shown in FIGS. 1–10; FIGS. 1–6 showing a first embodiment and FIGS. 7–10 showing a second embodiment. FIGS. 11 and 12, respectively, show the image projector 10 before and after placement in the accessory slot of a typical commercially available luminaire 12.

An image projector fabricated in accordance with this invention provides a compact and inexpensive means for projecting high-resolution images printed on plastic slides with commercially available luminaires by prolonging the life of image slides. The image slides may be made from any commercially available plastic transparency film (for example, made from polyester) having a computer-generated image printed thereon using any conventional printing technique, for example, ink-jet or laser printing may be used, but ink-jet printing provides longer lasting images. Preferably, the image slides are made from high temperature resistant plastic, but this is not required. The image slides can thus be easily produced and are readily interchangeable into the image projector.

Figure 1:
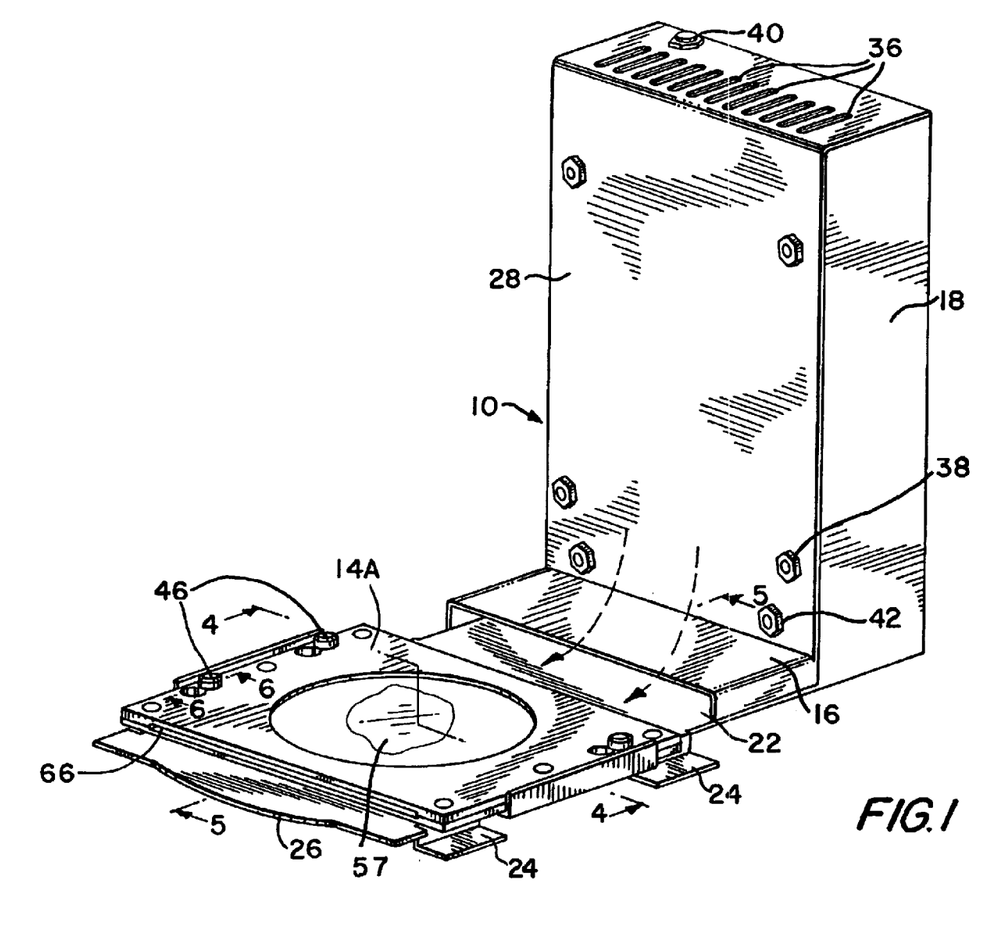
FIG. 1 is a perspective view of an image projector including a holder assembly and a slide assembly in accordance with a preferred embodiment of the invention.
Figure 2:
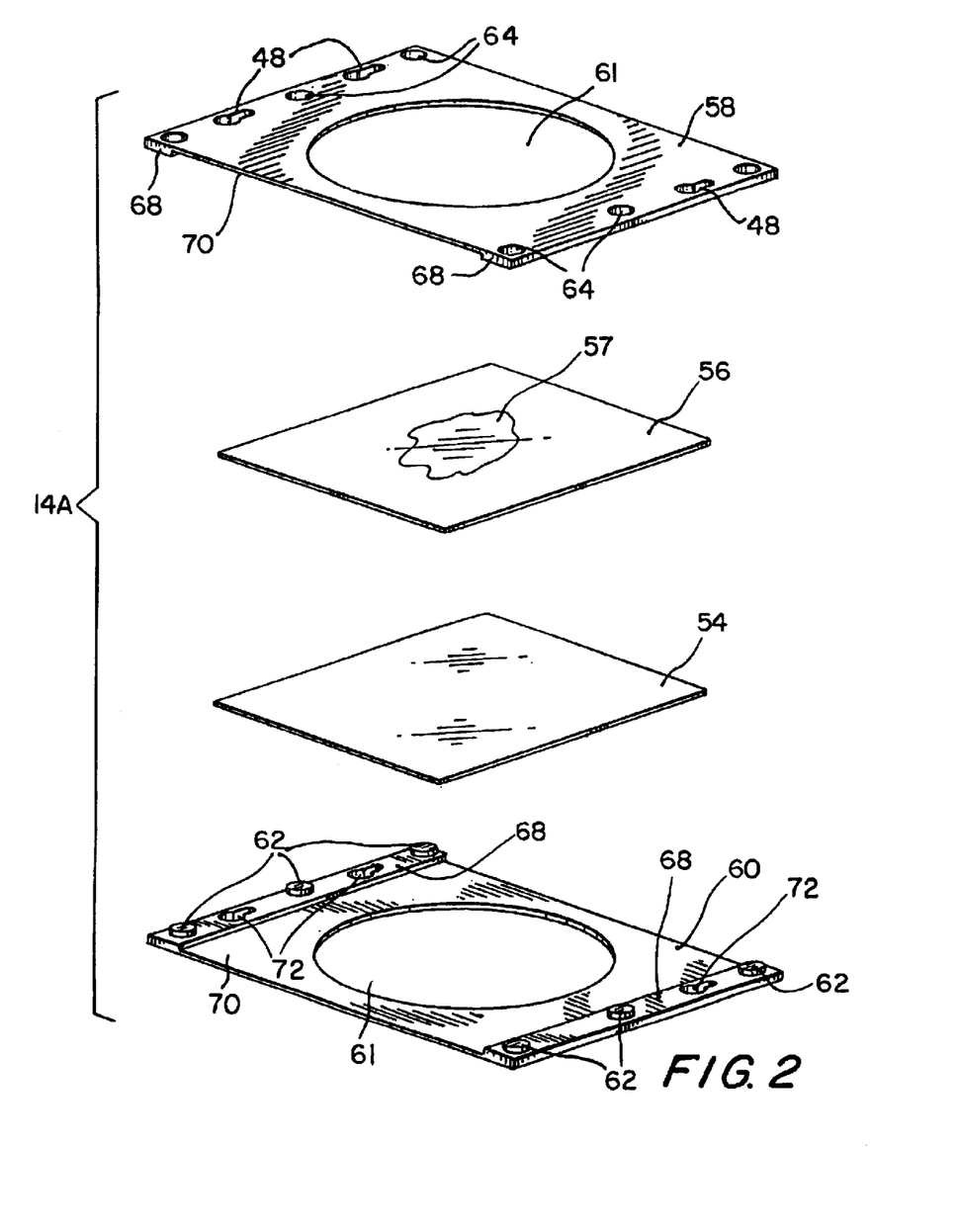
FIG. 2 is an exploded view of the slide assembly shown in FIG. 1.
Figures 7, 8:
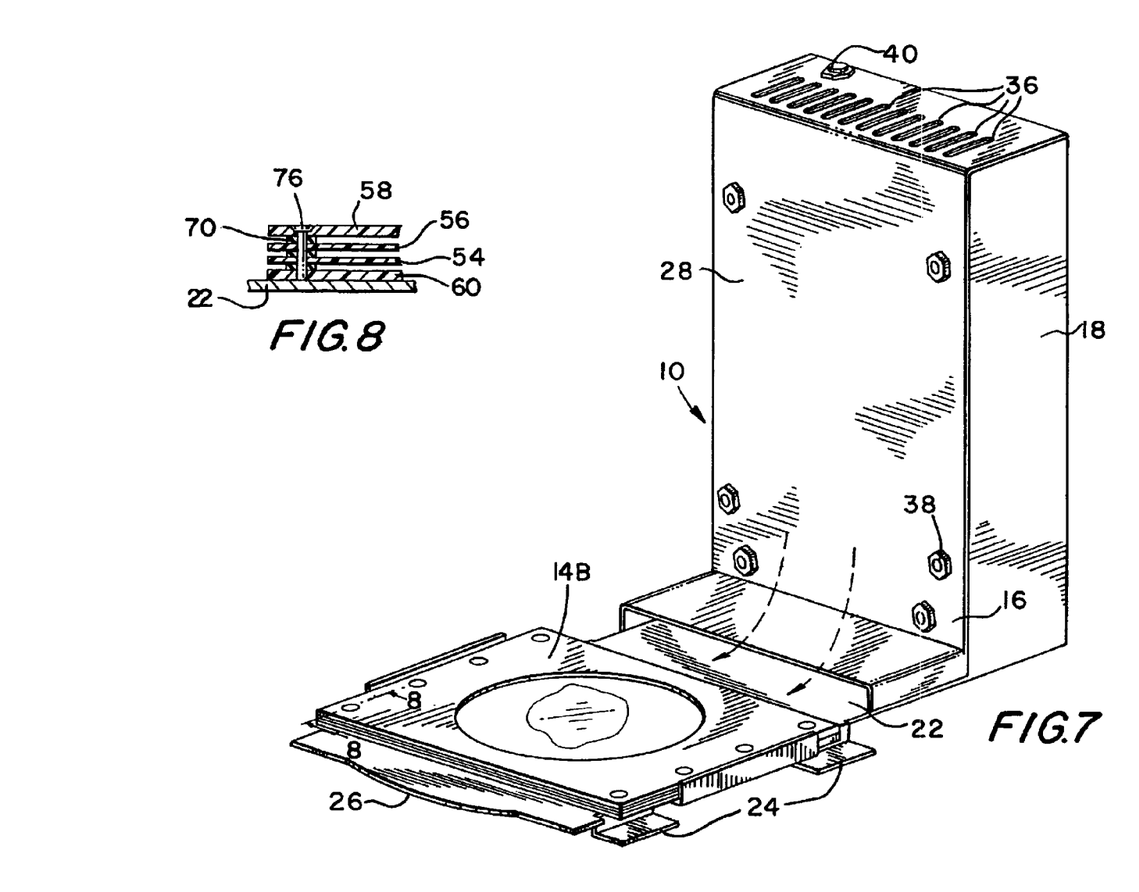
FIG. 7 is a perspective view of an image projector including a holder assembly and a slide assembly in accordance with another preferred embodiment of the invention.
FIG. 8 is a cross-sectional view of the image projector shown in FIG. 7, taken along the line 8—8.

In general, the image projector protects the image slides using the combination of a cooling fan and at least one ultraviolet ("UV") and/or infrared ("IR") filter. Referring to FIGS. 1 and 7, the image projector 10 comprises two main sections—a removable slide assembly 14A (FIG. 1), 14B (FIG. 7) for holding an image slide and a protective film slide; and a cooling assembly 16 for holding the slide assembly 14A, 14B and cooling the image slide therein.

The cooling assembly 16 comprises an enclosure 18 for a cooling fan 20 (see FIG. 3) and a base plate 22 arranged with a unique combination of alignment tabs that allow the base plate to fit into the accessory slot of many different commercially available luminaires without any modification to the luminaire; in particular, the pattern of tabs and ears 24 along the sides of the base plate, as well as the curved shape at the bottom 26 of the base plate. The length and width of the base plate 22, as well as the dimensions and pattern of tabs and ears 24, may be changed to accommodate other types of luminaires.

Any type of fan capable of blowing air through and out of the fan enclosure may be used in this invention. It has been found that a turbine fan, which blows air in line with the fan's blades is preferred. For example, a turbine fan marketed under the tradename "Cyclone Blower" by Antec, Inc. (Freemont, Calif.) may be used.

Figure 3:
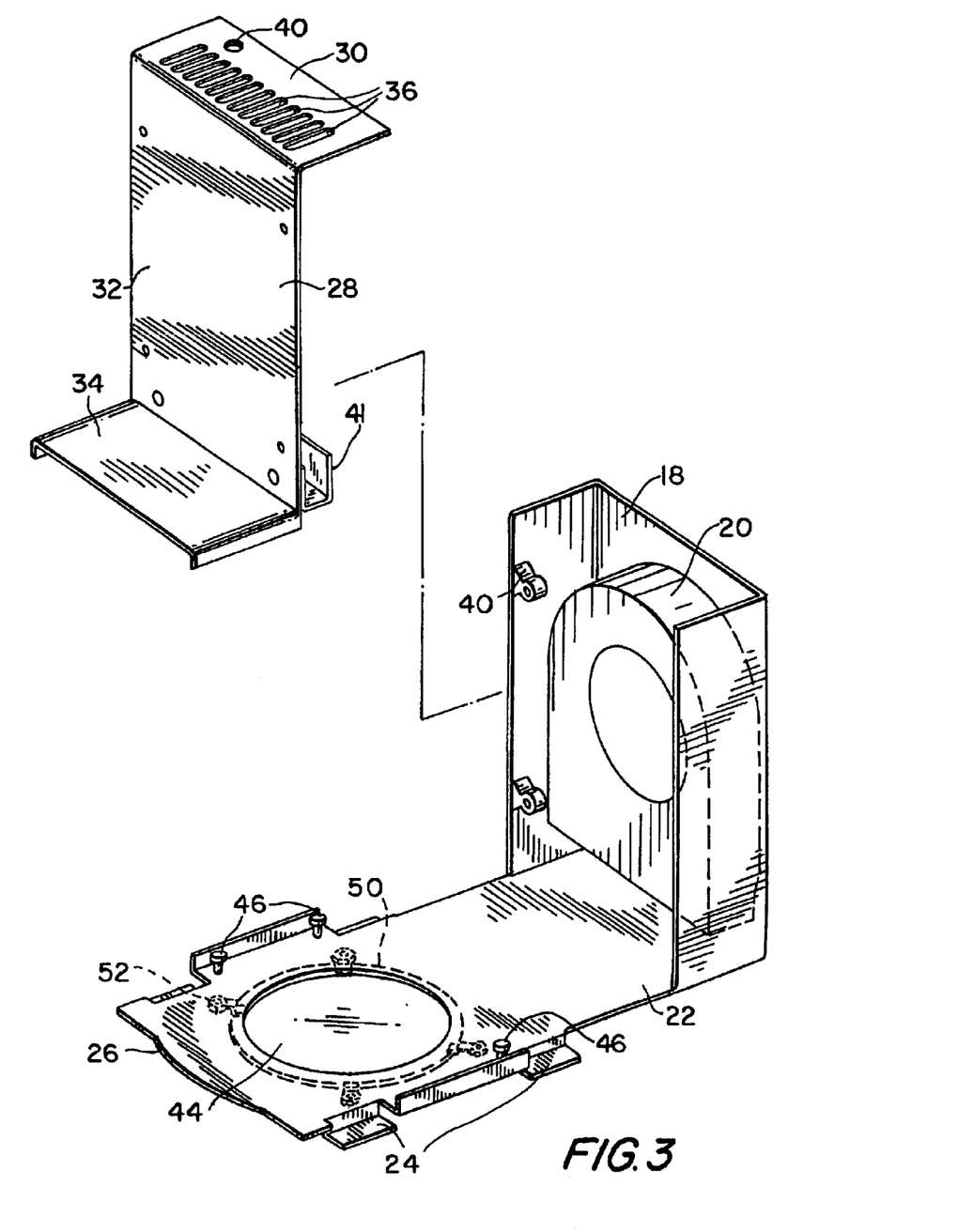
FIG. 3 is a perspective view of the holder assembly shown in FIG. 1 (with its cover and slide assembly removed).
Figure 4:
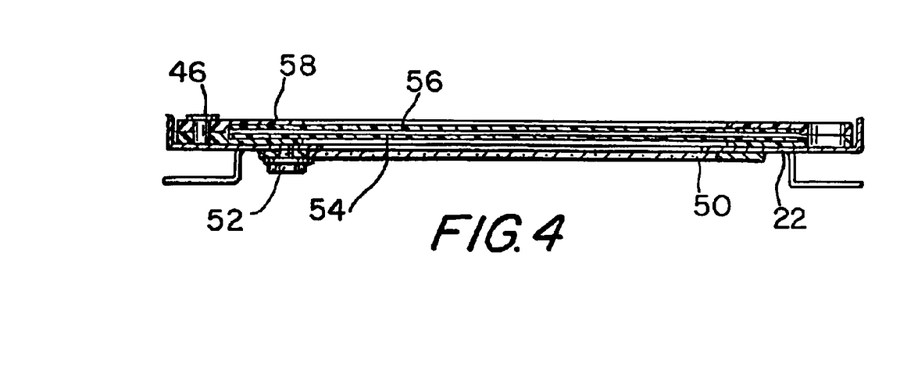
FIG. 4 is a cross-sectional view of the image projector shown in FIG. 1, taken along the line 4—4.
Figure 5:
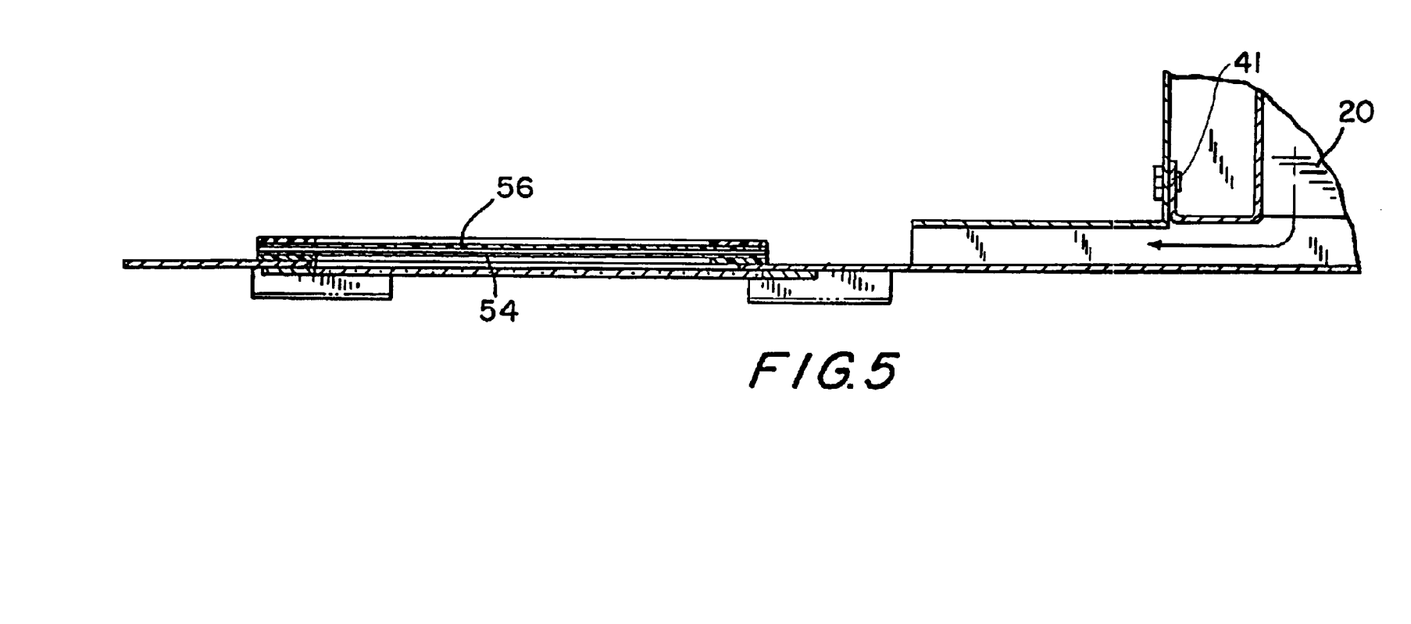
FIG. 5 is a cross-sectional view of the image projector shown in FIG. 1, taken along the line 5—5.
Figure 6:
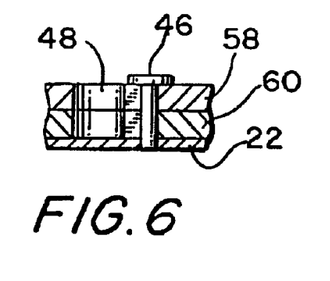
FIG. 6 is a cross-sectional view of the image projector shown in FIG. 1, taken along the line 6—6.

The base plate 22 and fan enclosure 18 are arranged substantially perpendicular to one another and may be fabricated from any type of strong metal or metal alloy capable of withstanding temperatures of at least 200° C., preferably steel. The fan enclosure comprises a removable cover 28 (as shown in FIG. 3) having a horizontal top section 30, a vertical middle section 32 and a horizontal bottom section 34 that extends away from the middle section in a direction opposite that of the top section and extends toward the end of the base plate 26. The removable cover may be secured to the fan enclosure by any known means. For example, screws 38 may be screwed through the middle section of the fan enclosure cover and into anchors 40 extending from an interior surface of the fan enclosure. The cover 28 may be made from any metal or metal alloy, but preferably comprises aluminum.

The top section 30 of the fan enclosure comprises a vent system comprising a series of slots 36 that allows cool, fresh air to flow into the fan enclosure when the fan 20 is turned ON. The vent system may be modified to include any type of aperture that permits air to flow through the top section and into the fan enclosure. The top section also comprises an aperture 40 for the fan's power cord to pass through. Alternatively, an aperture for the power cord may be placed in the sides or back of the fan enclosure.

To conserve energy, the fan's power cord may be plugged into the same electrical circuit (e.g., a dimmer circuit) as the luminaire to allow for simultaneous control of light output and flow of cooling air. This is advantageous because as the luminaire's light output is reduced, the heat created by the lamp is reduced and thus requires less cooling air. Therefore, as the luminaire is dimmed or brightened to adjust its light output, the fan in the image projector and subsequent airflow, will be similarly adjusted.

The bottom section 34 of the fan enclosure cover forms a plenum having a top and two sides, and when the cover is attached to the fan enclosure, the plenum forms an open space along the base plate 22 that directs the flow of air across the base plate. When the fan is turned ON, the fan draws fresh, cool air into the fan enclosure through the vent system 36, and forces the cool air out of the bottom portion of the fan 20, through the plenum, down along the base plate 22 (as indicated by the arrows in FIGS. 1, 5, 7 and 10) and through the slide assembly 14A, 14B, which is removably attached to the base plate. An air guard 41 is installed in the fan enclosure near the plenum to direct the flow of cool air out of the plenum and to prevent cool air from flowing back into the fan enclosure (see FIGS. 3 and 5). The air guard 41 is a generally U-shaped structure that extends substantially the entire width of the fan enclosure and substantially from the inner surface of the fan enclosure's middle section 32 to the outer surface of the fan 20. The air guard 41 may be attached to the interior surface of the fan enclosure cover's middle section 32, for example, by screws 42, or it may be attached to the interior sides of the fan enclosure.

The base plate 22 extends substantially perpendicular to the fan enclosure and comprises a central aperture 44 that allows light from the luminaire's lamp to pass through and means for receiving the slide assembly. The slide assembly 12 may be removably attached to the base plate 16 with screws or other commercially available fastening devices, but preferably has key slots that fit over keyway buttons 46 that extend up from the base plate 22 for locking (as shown in FIG. 1). The keyway buttons 46 are arranged on the base plate in an asymetrical nature such that the slide assembly 12 may be installed in only one way. This prevents a user from incorrectly installing the slide assembly, which may cause damage to the image slide.

Referring to FIG. 3, a glass reflector or filter 50 is mounted to the base plate 22 over the aperture 44 with at least two brackets 52 (four are shown) either on the top surface of the bottom plate 22 or on the bottom surface (as shown). The glass filter 50 may also be mounted with a screw and washer combination (the washer acting as a bracket), heat-sensitive adhesives or other known means. Further, the glass filter may be mounted in a metal ring prior to installation to prevent breakage when the being installed onto the base plate.

The glass filter 50 blocks both IR and UV energy from the luminaire's lamp. A preferred filter of this type also blocks the portion of visible light from 400–420 nanometers, and reduces overall transmission of light by 20%. A preferred filter for this invention was derived from the 38,000 IR/UV Filter commercially available from Rosco Laboratories, Inc., Stamford, Conn., which was modified to block the portion of visible light from 400–422 nanometers and to reduce light transmission by 20%. The glass filter 50 thus substantially reduces the amount of heat that is transmitted through the filter to the slide assembly.

Figure 9:
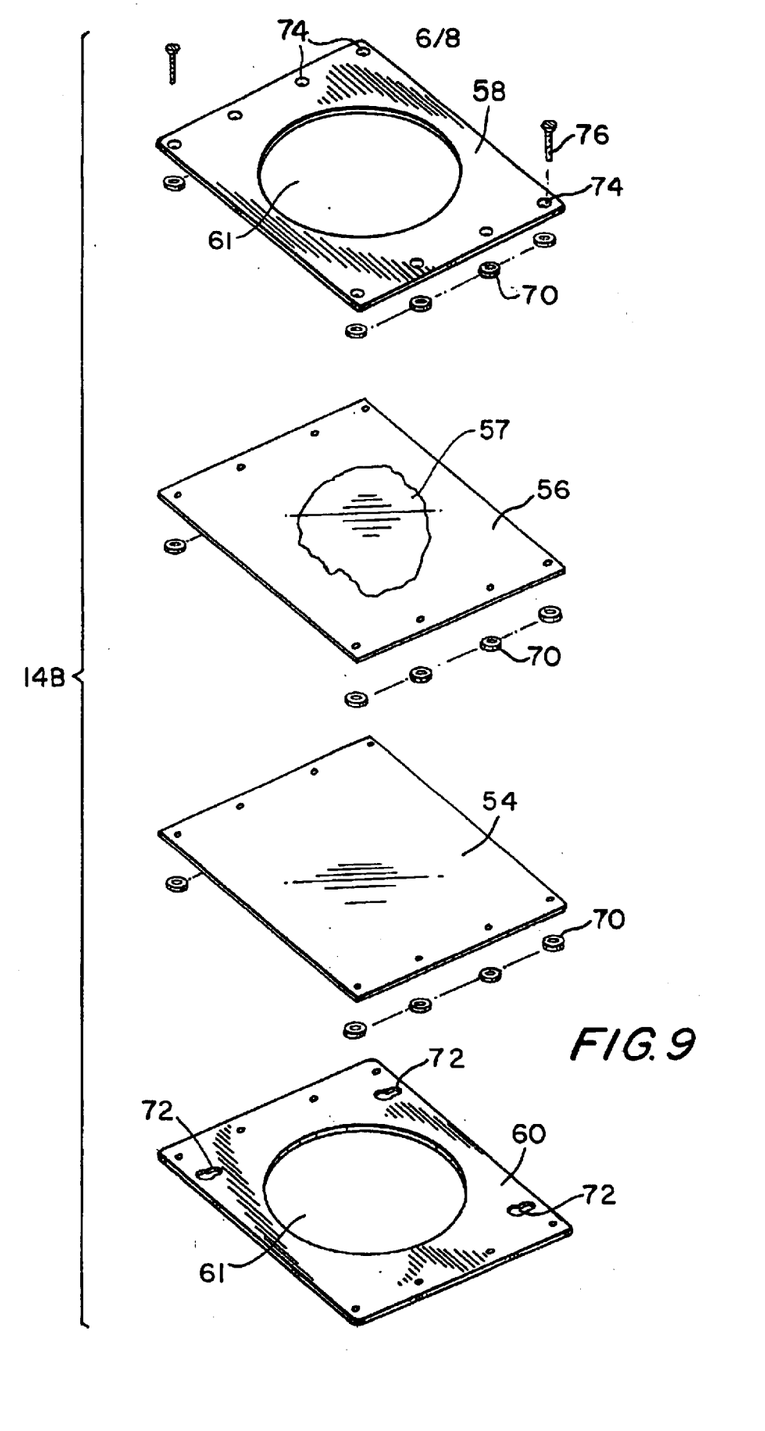
FIG. 9 is an exploded view of the slide assembly shown in FIG. 7.

Further protection from the heat of the luminaire's lamp is provided by the construction of the slide assemblies 14A (FIG. 2), 14B (FIG. 14B). Both slide assemblies generally comprise an IR reflecting protective film layer 54 and an image slide layer 56 surrounded on both sides by top 58 and bottom 60 mounting plates. In both embodiments, the top and bottom mounting plates have a central aperture 61 that allows light from the luminaire's lamp to pass through the slide assembly. The image 57 on the image slide 56 should be positioned approximately in the center of the central aperture 61.

In the first embodiment (FIG. 2), the slide assembly 14A comprises top 58 and bottom 60 mounting plates, preferably made of plastic, one (the bottom as shown) having a series of protruding snaps 62 on its interior surface and the other (the top as shown) having a corresponding series of holes 64 in its interior surface, such that the snaps 62 can be inserted into the holes 64 and snapped together to connect the top and bottom mounting plates together. The snaps 62 and holes 64 are placed in raised areas 68 along the two sides of top and bottom plates, leaving a recessed area 70 between the two raised areas. Thus, when the top and bottom plates are connected together, a slot or air gap 66 is formed between the plates to permit air from the cooling assembly's plenum to flow through and around both the image and protective film layers (see FIG. 1). The protective film layer 54 and the image slide layer 56 are inserted between the top and bottom mounting plates prior to connection and are secured in the slide assembly by either the force of the connection between the top and bottom plates or, preferably, the layers are adhered to the top and bottom plates respectively in the recessed areas 70 (as shown in FIG. 1). Alternatively, the layers may be adhered to each other using a heat resistant double-sided adhesive tape or the like.

In a second embodiment (FIG. 9), the image slide layer 56 and protective film layer 54 are sandwiched between top 58 and bottom 60 mounting plates of any material, for example, plastic or aluminum, each layer being separated by spacers 71 (for example, nylon washers) to allow air from the cooling assembly's plenum to flow through the slide assembly 14B. The spacers 71 are used to separate each layer of slide assembly 14B to allow cooling air from the fan 20 to flow across both surfaces of the protective film layer 54 and the image slide layer 56. The spacers 71 may be metal, nylon or other type of material and are placed between the layers as follows: (1) between the bottom mounting plate 60 and the protective film layer 54; (2) between the protective film layer 54 and the image slide layer 56; and (3) between the image slide layer 56 and the top mounting plate 58. Alternatively, the spacers between the bottom mounting plate 60 and the protective film layer 54, and the image slide layer 56 and the top mounting plate 58, may be removed if the film layer 54 is adhered to the bottom mounting plate and the image slide layer 56 is adhered to the top mounting plate 58. Each layer may be adhered to each other with heat-resistant double-sided adhesive tape or the like, or the spacers could be made from an adhesive material, or the slide assembly may be held together by a pin system similar to the first embodiment.

Figure 10:
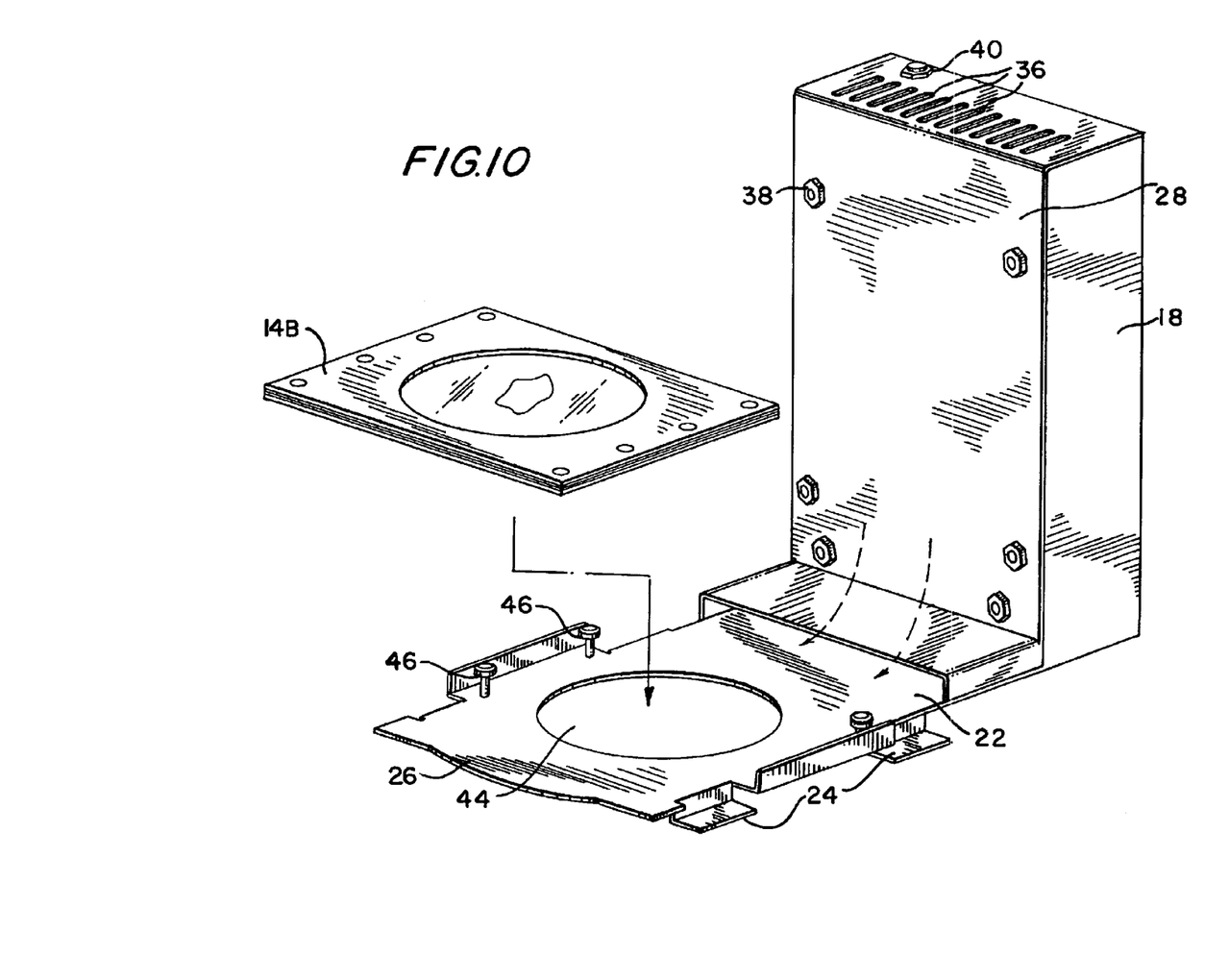
FIG. 10 is a perspective view of the image projector shown in FIG. 7 with the slide assembly removed from the holder assembly.

In both embodiments, the bottom mounting plates 60 have three key apertures 72 shaped to be locked onto the three keyway buttons 46 on the base plate 22 (see FIGS. 1, 3 and 10). The top mounting plate 58 may also have three similarly shaped key apertures 48 for locking onto the keyway buttons 46. The number of keyway buttons may be modified, provided the slide assembly is sufficiently secured to the base plate to prevent rotation. It is also preferred that the number and arrangement of keyway buttons be asymmetrical to prevent a user from improperly installing the slide assembly onto the base plate.

In the second embodiment, the bottom mounting plate 60 may also have a series of smaller mounting holes 74 along at least two sides thereof (aligned with the spacers 71) that permit mounting posts 76 to hold the film layer 54, image slide layer 56 and spacers 71 in place.

The protective film layer 54 is a polyester film coated with a metalized IR reflective surface. This additional layer of IR reflector protects the image from any damaging IR energy that is not reflected by the glass filter 50 mounted on the base plate 22.

Once the slide assembly 14A, 14B is assembled with an image slide layer 56, it can be easily attached to and removed from the base plate 22 (as shown in FIGS. 3 and 10) The assembled unit or image projector 10 (shown in FIGS. 1 and 7) may then be inserted into a luminaire 12 as shown in FIGS. 11 and 12, with base plate 22 and slide assembly 14A, 14B sliding into the luminaire's accessory slot 78, and the cooling assembly 16 sitting above the front portion 80 of the luminaire's body. The image projector 10 is installed such that the base plate 22 is closer than slide assembly 14 to the luminaire's lamp (situated at the rear 82 of the luminaire), and the cooling assembly 16 extends toward the front of the luminaire. Thus, the luminaire's lamp shines first through the glass filter 50 on the base plate 16 and then through protective film layer 54 and then through the image slide 56 to project the image in the slide assembly.

Together, the cooling assembly 16 and the slide assembly 14 protect the slide image 56 from heat and damaging light, allowing otherwise fragile plastic images to survive for substantially longer periods than they do under normal use (up to about fifty hours of use). More particularly, the flow of air from the fan provides cooling air circulation through and around the slide assembly 14, which in combination with the layered IR and UV filtering in the glass filter 50 and the film layer 54 protects the slide image from high operating temperatures. Thus, images can be displayed and used on regular transparency film without serious heat damage even after extended time periods or multiple uses.

For example, when tested on luminaires of 600 watts or less, with light output at 100%, image slides in the image projector of this invention lasted for 30 to 50 continuous hours with no degradation of the image. When the luminaire was dimmed to approximately 50% light output, the life span is virtually infinite. Therefore, since a theatrical application typically uses an image slide for less than one hour per performance, a single image slide may be used for 30 performances or more, providing a substantial cost savings to the production.

Although the invention has been described with reference to a preferred embodiment, it will be appreciated by one of ordinary skill in the art that numerous modifications are possible in light of the above disclosure. For example, although it is preferred that the image projector use the same electrical circuit as the luminaire, it is not required. Further, the size of the aperture could vary and still be effective. The size of the slide assembly, so long as it covered the aperture could also vary. The unique shape of the base plate allows the single device to fit into multiple luminaires, however, one could modify the base plate to fit into a specific luminaire. Fans of various styles could be used, though a turbine fan proved most efficient. Further, the unit is equally effective if both filters are installed on the base plate, as opposed to one being in the slide assembly, as long as equivalent airflow between the filters and image is achieved. A further advantage of the invention is that the image projector can also protect color filter materials, such as gel. Using gel in place of the image layer achieves a significantly extended life span over color filter used in the traditional color frame location. All such variations and modifications are intended to be within the scope and spirit of the invention.

I claim:

1. An image projection apparatus for projecting an image printed on a plastic sheet for extended time periods from an accessory slot in a luminaire having a light source that shines light comprising ultraviolet and infrared energy, the apparatus comprising:

(a) a base plate for insertion into the accessory slot having an aperture positioned such that the light shines through the aperture;

(b) light filter means for substantially removing the ultraviolet and infrared energy from the light before the light shines through the image;

(c) image holding means for removably positioning the image over the aperture in the base plate; and (d) cooling means for directing a flow of cool air across the base plate and through the image holding means.

2. The image projection apparatus of claim 1, wherein the light filter means comprises an ultraviolet and infrared reflective filter and an infrared reflective film, both positioned over the aperture.

3. The image projection apparatus of claim 2, wherein the ultraviolet and infrared reflective filter is detachably mounted on the base plate and the infrared reflective film is mounted in the image holding means below the plastic image sheet.

4. The image projection apparatus of claim 2, wherein the ultraviolet and infrared reflective filter blocks a portion of the light from 400–420 nanometers.

5. The image projection apparatus of claim 1, wherein the base plate has side edges and a bottom edge that are inserted into the accessory slot, the side edges each comprising at least one alignment tab, the bottom edge having at least a partial arcuate shape, such that the apparatus may be used with many different luminaires.

6. The image projection apparatus of claim 1, wherein the image holding means comprises a mounting plate, an infrared reflective film positioned between the mounting plate and the plastic image sheet, and attachment means for removably attaching the mounting plate to the base plate.

7. The image projection apparatus of claim 6, wherein the attachment means comprises means for preventing improper installation of the mounting plate to the base plate.

8. The image projection apparatus of claim 6, further comprising a second mounting plate, wherein the infrared reflective film is adhered to the mounting plate and the plastic image sheet is adhered to the second mounting plate, such that a space is created between the infrared reflective film and the image sheet that allows cool air to flow between the infrared reflective film and the plastic image sheet.

9. The image projection apparatus of claim 6, further comprising spacers placed between the mounting plate and the infrared reflective film, and the infrared reflective film and the plastic image sheet, such that the cooling air from the cooling means can flow between the mounting plate and the infrared reflective film, and the infrared reflective film and the plastic image sheet.

10. The image projection apparatus of claim 1, wherein the cooling means comprises a housing for substantially enclosing a fan, one end of the housing being mounted on the base plate and having an aperture, an opposite end having an aperture for drawing fresh air into the housing, the end mounted on the base plate further comprising a plenum for directing the flow of cool air out of the housing, across the base plate and into the image holding means.

11. The image projection apparatus of claim 10, wherein the cooling means further comprises an air guard extending across the housing for preventing air from flowing back into the housing.

12. An image projection apparatus for projecting an image printed on a plastic sheet for extended time periods from an accessory slot in a luminaire having a light source that shines light comprising ultraviolet and infrared energy, the apparatus comprising:

(a) a base plate for insertion into the accessory slot, the base plate having an aperture positioned such that the light shines through the aperture;

(b) light filter means detachably mounted on the base plate over the aperture for substantially removing the ultraviolet and infrared energy from the light;

(c) a removable image holding means for loading the plastic image sheet into the apparatus and positioning the image over the aperture, the image holding means further comprising a protective film positioned over the aperture for removing infrared energy; and (d) a cooling means for directing a flow of cool air across the base plate and through the image holding means.

13. The image projection apparatus of claim 12, wherein the light filter means comprises an ultraviolet and infrared reflective filter that blocks a portion of light from 400–420 nanometers.

14. The image projection apparatus of claim 12, wherein the base plate has side edges and a bottom edge that are inserted into the accessory slot, the side edges comprising a series of alignment tabs, the bottom edge having at least a partial arcuate shape, such that the apparatus may be used with many different luminaires.

15. The image projection apparatus of claim 12, wherein the image holding means comprises a mounting plate and attachment means for removably attaching the mounting plate to the base plate, wherein the protective film is positioned between the mounting plate and the plastic image sheet.

16. The image projection apparatus of claim 15, further comprising a second mounting plate positioned on top of the plastic image sheet, the mounting plate and the second mounting plate having means for securing the mounting plate to the second mounting plate and the protective film and the plastic image sheet therebetween.

17. The image projection apparatus of claim 16, wherein the mounting plate and the second mounting plate each have a recessed portion such that when mounted together an open space is created between the mounting plate and the second mounting plate to allow for the flow of cool air through the image holding means.

18. The image projection apparatus of claim 15, wherein the protective film and the plastic image sheet are respectively adhered to the recessed portion of the mounting plate and the second mounting plate, such that cool air from the cooling means can flow between the protective film and the plastic image sheet.

19. The image projection apparatus of claim 15, further comprising spacers placed between the mounting plate and the protective film, and the protective film and the plastic image sheet, such that the cooling air from the cooling means can flow between the mounting plate and the protective film, and the protective film and the plastic image sheet.

20. The image projection apparatus of claim 12, wherein the cooling means comprises a housing for substantially enclosing a fan, one end of the housing being mounted on the base plate and having an aperture, an opposite end having an aperture for drawing fresh air into the housing, the end mounted on the base plate further comprising a plenum for directing the flow of cool air out of the housing, across the base plate and into the image holding means.

21. The image projection apparatus of claim 20, wherein the cooling means further comprises an air guard extending across the housing for preventing air from flowing back into the housing.

* * * * *